United States Patent
Sasaki et al.

(10) Patent No.: US 12,451,571 B2
(45) Date of Patent: Oct. 21, 2025

(54) BATTERY MODULE

(71) Applicant: KABUSHIKI KAISHA TOSHIBA, Tokyo (JP)

(72) Inventors: Yuji Sasaki, Yokohama (JP); Norio Shimizu, Ibaraki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 562 days.

(21) Appl. No.: 18/048,922

(22) Filed: Oct. 24, 2022

(65) Prior Publication Data
US 2023/0125103 A1    Apr. 27, 2023

(30) Foreign Application Priority Data
Oct. 25, 2021  (JP) .................. 2021-173854

(51) Int. Cl.
*H01M 50/583* (2021.01)
*H01M 50/505* (2021.01)

(52) U.S. Cl.
CPC ....... *H01M 50/583* (2021.01); *H01M 50/505* (2021.01)

(58) Field of Classification Search
CPC .................................................. H01M 50/583
See application file for complete search history.

(56) References Cited

U.S. PATENT DOCUMENTS

| | | | |
|---|---|---|---|
| 10,431,800 B2 | 10/2019 | Sato et al. | |
| 2019/0173072 A1* | 6/2019 | Chen | H01M 50/505 |
| 2020/0321589 A1 | 10/2020 | Watahiki et al. | |
| 2021/0143388 A1* | 5/2021 | Chang | H01M 50/509 |
| 2021/0218114 A1* | 7/2021 | Chida | H01M 50/502 |

FOREIGN PATENT DOCUMENTS

| | | |
|---|---|---|
| JP | 2011-216424 A | 10/2011 |
| JP | 2017-84606 A | 5/2017 |
| JP | 2017-112067 A | 6/2017 |
| JP | 2019-200858 A | 11/2019 |
| WO | WO 2019/069837 A1 | 4/2019 |

* cited by examiner

*Primary Examiner* — Brian R Ohara
(74) *Attorney, Agent, or Firm* — Oblon, McClelland, Maier &Neustadt, L.L.P.

(57) ABSTRACT

A battery module includes a first battery including a first terminal, a second battery including a second terminal, a bus bar located above the first and second batteries, and a cover member located below the bus bar. The bus bar includes a first part connected to the first terminal, a second part connected to the second terminal, and a fuse part positioned between the first part. The fuse part is meltable by a lower current than the first and second parts. The cover member is insulative. The cover member includes a cover part and a support part located on the cover part. In a state in which the fuse part has melted, the support part supports the first part so that a position of an end portion of the first part is higher than a position of an end portion of the second part.

7 Claims, 7 Drawing Sheets

BATTERY MODULE

CROSS-REFERENCE TO RELATED APPLICATIONS

This application is based upon and claims the benefit of priority from Japanese Patent Application No. 2021-173854, filed on Oct. 25, 2021; the entire contents of which are incorporated herein by reference.

FIELD

Embodiments relate to a battery module.

BACKGROUND

When two batteries are electrically connected by a bus bar, the bus bar may include a fuse part that melts when a current that is not less than a prescribed amount flows. The fuse part melts when the current that is not less than the prescribed amount flows in the bus bar. A part of the bus bar connected to one of two batteries and a part of the bus bar connected to the other of the two batteries are separated thereby. Thus, the fuse part functions as a fuse and can suppress the flow of the current that is not less than the prescribed amount from the one to the other of the two batteries.

DETAILED DESCRIPTION

Figure 1:
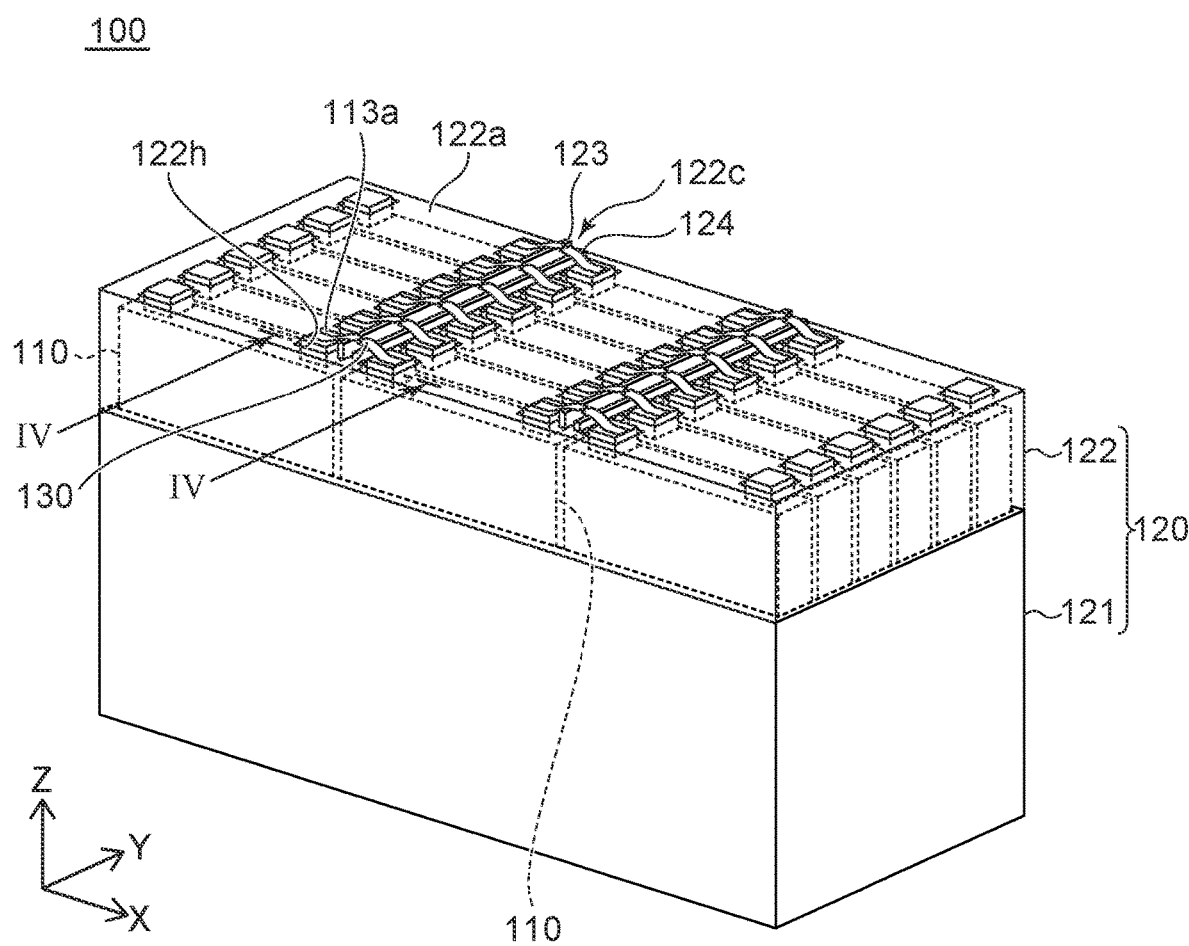
FIG. 1 is a perspective view showing a battery module according to a first embodiment.

In general, according to one embodiment, a battery module includes a first battery including a first terminal, a second battery including a second terminal, a bus bar located above the first and second batteries, and a cover member located below the bus bar. The bus bar is flexible. The bus bar includes a first part connected to the first terminal, a second part connected to the second terminal, and a fuse part positioned between the first part and the second part and linked to the first and second parts. The fuse part is meltable by a lower current than the first and second parts. The cover member is insulative. The cover member includes a cover part covering the first and second batteries and leaving the first and second terminals exposed, and a support part located on the cover part. In a state in which the fuse part has melted and the first and second parts are separated, the support part supports the first part so that a position of an end portion of the first part most proximate to the second part is higher than a position of an end portion of the second part most proximate to the first part.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

An XYZ orthogonal coordinate system is used for easier understanding of the following description. Among the Z-directions, the direction of the arrow is taken as an "upward direction"; and the opposite direction is taken as a "downward direction". The upward direction is the opposite direction of the direction of gravity.

First Embodiment

First, a first embodiment will be described.

FIG. 1 is a perspective view showing a battery module according to the embodiment.

Figure 2:
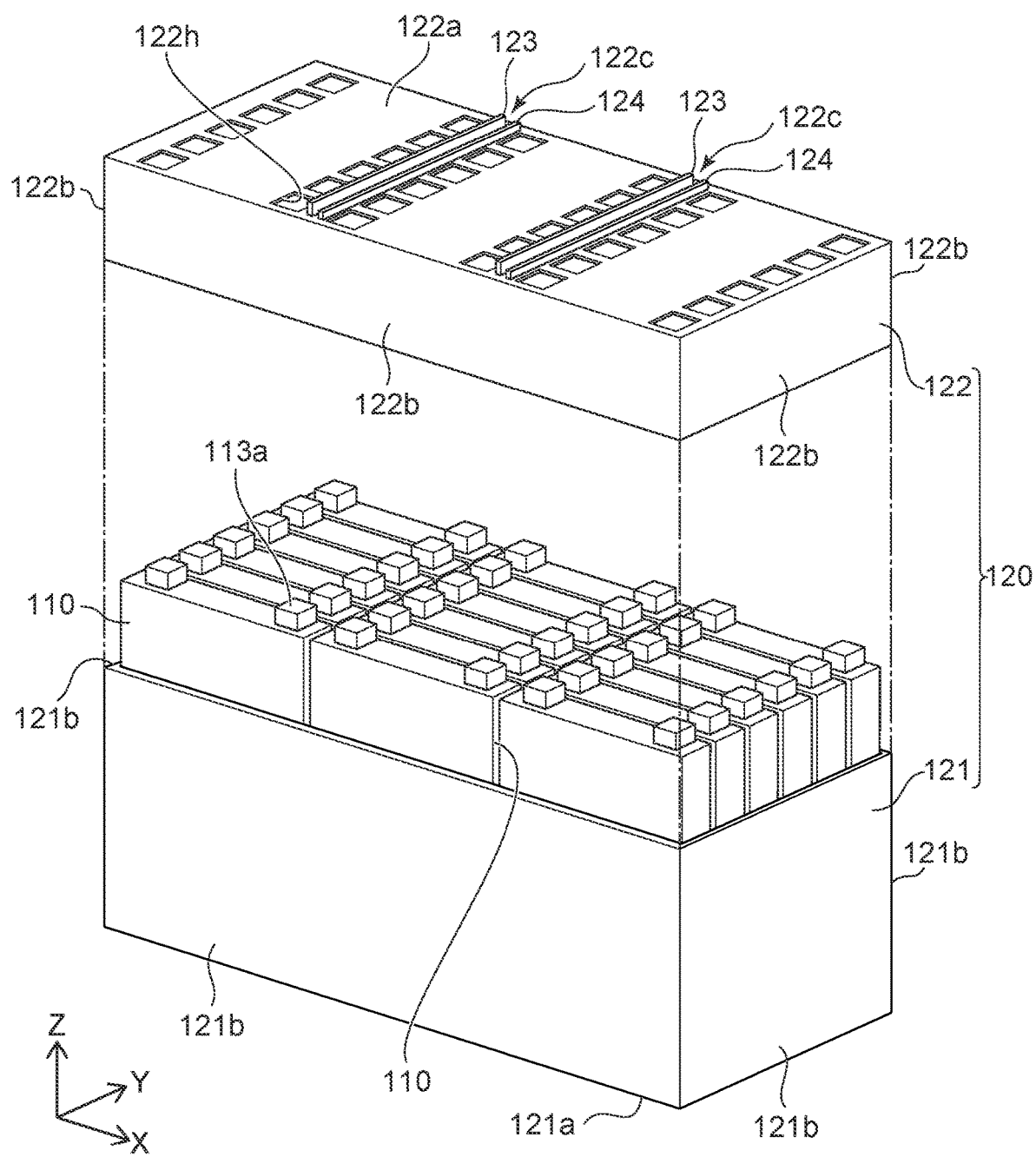
FIG. 2 is an exploded perspective view showing a housing and multiple batteries of the battery module of FIG. 1.

FIG. 2 is an exploded perspective view showing a housing and multiple batteries of the battery module of FIG. 1.

Figure 3:
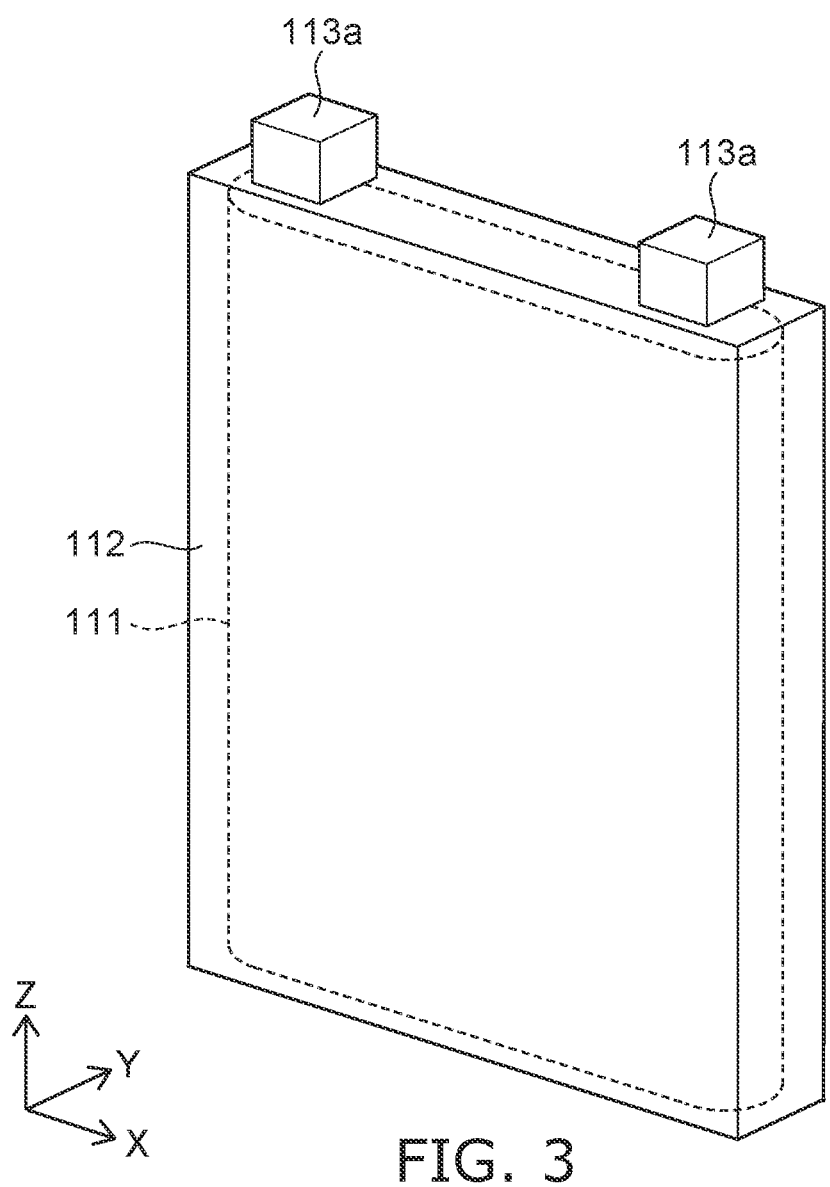
FIG. 3 is a perspective view showing the battery of the battery module of FIG. 1.

FIG. 3 is a perspective view showing the battery of the battery module of FIG. 1.

Figure 4A:
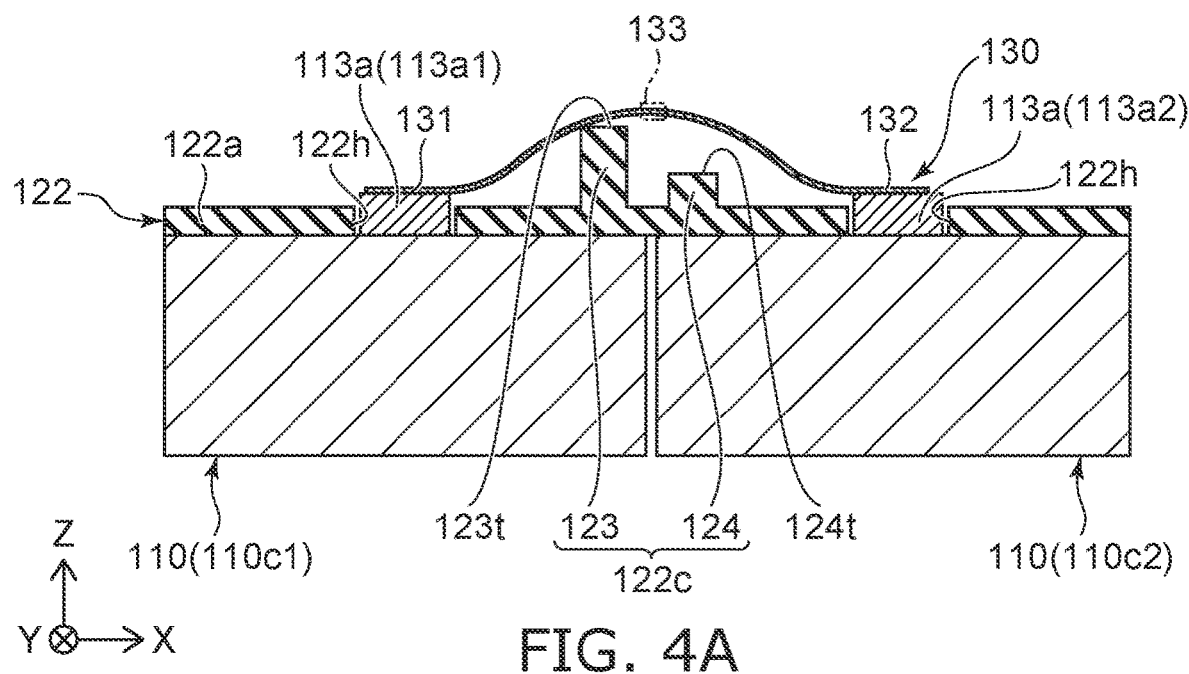
FIG. 4A is a cross-sectional view along line IV-IV of FIG. 1, and is a cross-sectional view showing a state before a fuse part of a bus bar has melted.
Figure 4B:
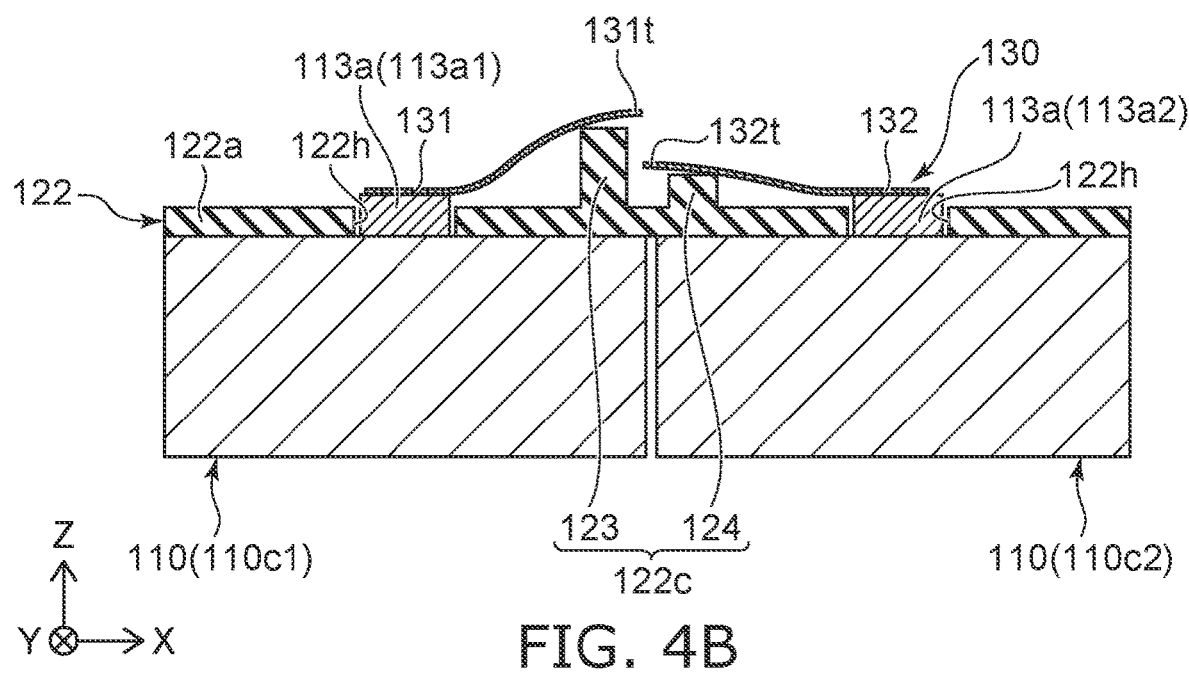
FIG. 4B is a cross-sectional view showing a state after the fuse part has melted.

FIG. 4A is a cross-sectional view along line IV-IV of FIG. 1, and is a cross-sectional view showing a state before the fuse part of the bus bar has melted; and FIG. 4B is a cross-sectional view showing a state after the fuse part has melted.

Figure 5A:
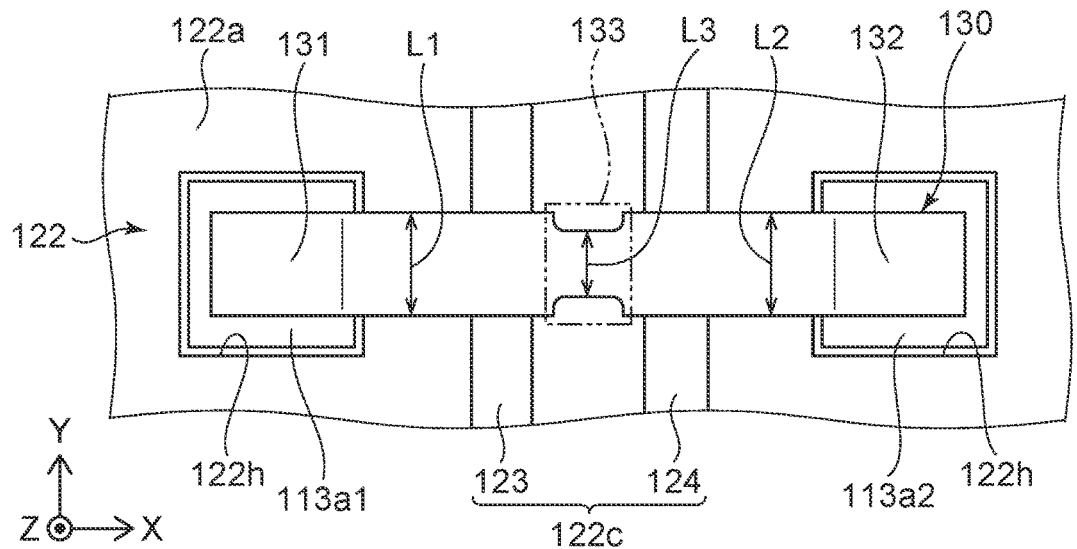
FIG. 5A is an enlarged top view showing the vicinity of the bus bar of FIG. 1.
Figure 5B:
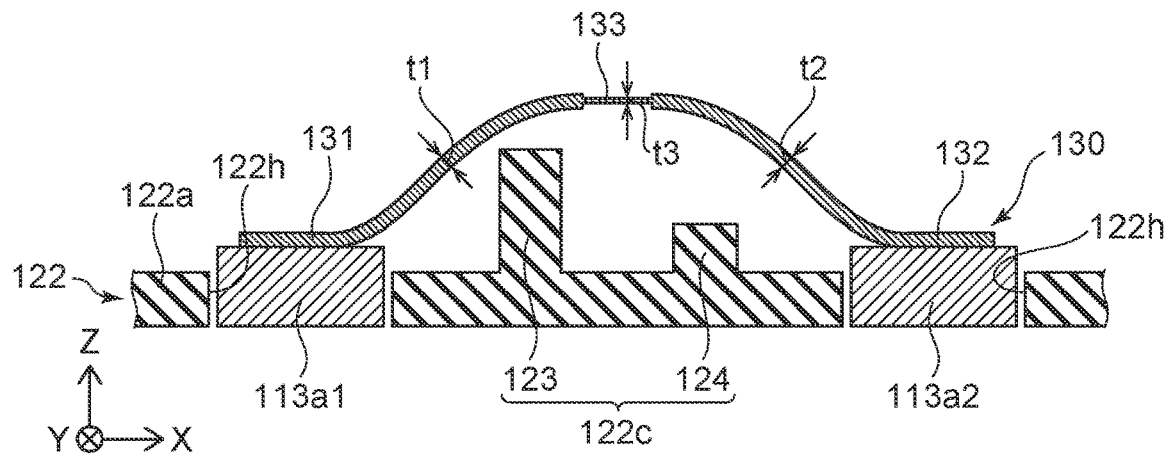
FIG. 5B is a cross-sectional view showing another example of the bus bar.
Figure 5C:
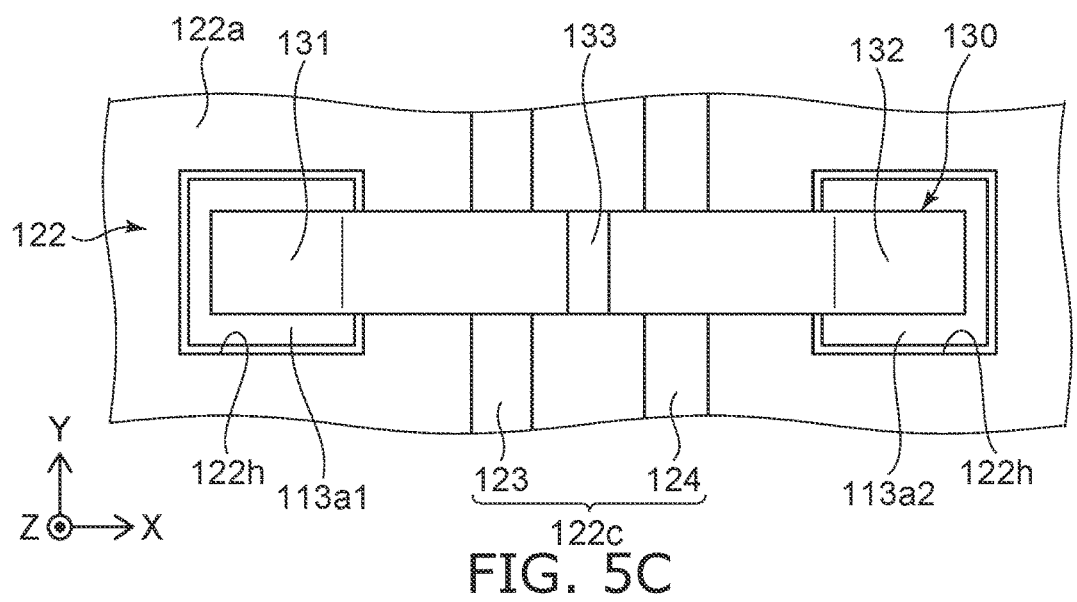
FIG. 5C is a cross-sectional view showing another example of the bus bar.

FIG. 5A is an enlarged top view showing the vicinity of the bus bar of FIG. 1; FIG. 5B is a cross-sectional view showing another example of the bus bar; and FIG. 5C is a cross-sectional view showing another example of the bus bar.

A battery module 100 according to the embodiment includes multiple batteries 110, a housing 120, and multiple bus bars 130. The components of the battery module 100 will now be elaborated.

Each battery 110 is, for example, a secondary battery such as a lithium ion battery, etc. As shown in FIG. 3, each battery 110 includes a power generation element 111, a battery housing 112, and two terminals 113a.

The power generation element 111 includes, for example, a positive electrode layer, a negative electrode layer, a separator located between the positive electrode layer and the negative electrode layer, etc.

The battery housing 112 houses the power generation element 111. The shape of the battery housing 112 is, for example, substantially cubic.

One terminal 113a of the two terminals 113a is electrically connected to one of the positive electrode layer or the negative electrode layer of the power generation element 111. The other terminal 113a of the two terminals 113a is electrically connected to the other of the positive electrode layer or the negative electrode layer of the power generation element 111. At least a portion of each terminal 113a protrudes higher than the upper surface of the battery housing 112. The lower portion of each terminal 113a may be inserted into the battery housing 112. Each entire terminal 113a may be located on the upper surface of the battery housing 112. In such a case, each terminal 113a is electrically connected to the positive electrode layer or the negative electrode layer via a conductive member.

As shown in FIGS. 1 and 2, the housing 120 includes a housing member 121 housing at least a portion of the multiple batteries 110, and a cover member 122 that is located on the housing member 121 and covers the multiple batteries 110. The shape of the housing 120 is, for example, substantially cubic when the cover member 122 is mounted to the housing member 121. The housing 120 can include an insulating material that has excellent heat resistance such as polycarbonate, a modified polyphenylene ether resin, etc. In other words, the housing 120 that includes the cover member 122 is insulative.

As shown in FIG. 2, the housing member 121 includes, for example, a bottom plate part 121a and four side plate parts 121b. The upper surface and the lower surface of the bottom plate part 121a are substantially parallel to the X-Y plane. The shape of the bottom plate part 121a when viewed in top-view is substantially a rectangle of which two of the four sides of the outer perimeter are parallel to the X-direction and the other two sides are parallel to the Y-direction. The side plate parts 121b extend upward from the sides of the outer perimeter of the bottom plate part 121a. A space that can house the lower portions of the multiple batteries 110 is formed inside the bottom plate part 121a and the four side plate parts 121b. However, it is sufficient to be able to house the multiple batteries; and the shape of the housing member is not limited to the shape described above. The housing member also may house components other than the batteries such as a circuit that controls the batteries, etc.

The multiple batteries 110 are arranged in a matrix configuration in the X-direction and the Y-direction in the housing member 121. For example, the upper portions of the multiple batteries 110 are exposed outside the housing member 121. FIGS. 1 and 2 show an example in which eighteen batteries 110 are located in the housing member 121. However, the number of batteries in the housing member is not limited to the example described above. Also, the arrangement of the multiple batteries is not limited to the arrangement shown in FIGS. 1 and 2.

The cover member 122 includes, for example, a cover part 122a, four side plate parts 122b, and multiple support parts 122c.

The cover part 122a is positioned above the multiple batteries 110 and covers the multiple batteries 110. For example, the upper surface and the lower surface of the cover part 122a are substantially parallel to the X-Y plane. The shape of the cover part 122a when viewed in top-view is substantially a rectangle of which two of the four sides of the outer perimeter are parallel to the X-direction and the other two sides are parallel to the Y-direction. Multiple through-holes 122h that expose the terminals 113a of the batteries 110 are provided in the cover part 122a.

The side plate parts 122b extend downward from the sides of the outer perimeter of the cover part 122a.

The support parts 122c are located on the cover part 122a. Each support part 122c is positioned below at least one bus bar 130. According to the embodiment, one support part 122c is positioned below multiple bus bars 130. However, a support part may be individually located below each bus bar.

In the example described herein, each bus bar 130 electrically connects two batteries 110 that are next to each other in the X-direction as shown in FIG. 1. One of the two batteries 110 electrically connected by each bus bar 130 also is called a "first battery 110c1"; and the other battery also is called a "second battery 110c2". The terminal 113a of the first battery 110c1 that is connected to the bus bar 130 is called a "first terminal 113a1". The terminal 113a of the second battery 110c2 that is connected to the bus bar 130 is called a "second terminal 113a2". FIGS. 4A and 4B simply and integrally show the parts of the batteries 110 below the terminals 113a. This is similar for the other cross-sectional views as well. However, the first battery and the second battery that are connected by the bus bar may not always be next to each other. For example, another component of the battery module may be interposed between the first battery and the second battery. Also, the first battery and the second battery that are connected by the bus bar may be next to each other in another direction such as the Y-direction, etc.

According to the embodiment as shown in FIG. 4A, each support part 122c includes a first protrusion 123 and a second protrusion 124. The first protrusion 123 and the second protrusion 124 each protrude upward from the cover part 122a. The position of an upper end 123t of the first protrusion 123 in the vertical direction is higher than the position of an upper end 124t of the second protrusion 124. The first protrusion 123 is located above the first battery 110c1. The second protrusion 124 is located above the second battery 110c2. However, when the first battery and the second battery are not next to each other, the first protrusion may not be located on the first battery; and the second protrusion may not be located on the second battery.

According to the embodiment as shown in FIG. 2, the first protrusion 123 and the second protrusion 124 each extend in the Y-direction. Therefore, the first protrusion 123 and the second protrusion 124 each are positioned above the multiple batteries 110 that are arranged in the Y-direction.

The bus bars 130 are flexible. Each bus bar 130 is, for example, a metal foil. The thickness of each bus bar 130 is, for example, not less than 0.1 mm and not more than 0.3 mm. As shown in FIGS. 4A and 5A, each bus bar 130 includes a first part 131, a second part 132, and a fuse part 133. The first part 131 is connected to the first terminal 113a1. The second part 132 is connected to the second terminal 113a2. The fuse part 133 is positioned between the first part 131 and the second part 132 and is linked to the first and second parts 131 and 132. According to the embodiment, a width L3 of the fuse part 133 is less than a width L1 of the first part 131 and a width L2 of the second part 132. Therefore, the fuse part 133 is meltable by a lower current than the first part 131 and the second part 132.

Another method may be used to configure the fuse part 133 to be melted by a lower current than the first part 131 and the second part 132. For example, as shown in FIG. 5B, a thickness t3 of the fuse part 133 may be less than a thickness t1 of the first part 131 and a thickness t2 of the second part 132. Or, as shown in FIG. 5C, the fuse part 133 may be formed of a material that is melted by a lower current than the materials of the first and second parts 131 and 132. By using the configurations shown in FIG. 5B or FIG. 5C as well, the fuse part 133 is meltable by a lower current than the first part 131 and the second part 132.

As shown in FIG. 4A, for example, each bus bar 130 is connected to the first and second terminals 113a1 and 113a2 in a state in which the bus bar 130 is deflected to be convex upward. Specifically, when connected to the first and second terminals 113a1 and 113a2, each bus bar 130 has a shape that is curved to be convex upward so that the fuse part 133 is at the apex. In this state, the first part 131 contacts the first protrusion 123; and the second part 132 is separated from the second protrusion 124. However, the first part may be separated from the first protrusion; and the second part may contact the second protrusion.

As shown in FIG. 5A, a portion of the first part 131 overlaps the first protrusion 123 when viewed from above. A portion of the second part 132 overlaps the second protrusion 124 when viewed from above. The fuse part 133 is positioned between the first protrusion 123 and the second protrusion 124 when viewed from above.

A method for using the battery module 100 according to the embodiment will now be described.

The fuse part 133 melts when a current that is not less than a prescribed amount flows in the bus bar 130. As shown in FIG. 4B, the first part 131 and the second part 132 are separated by the fuse part 133 melting. The separated first part 131 is supported by the first protrusion 123. The separated second part 132 falls due to gravity and is supported by the second protrusion 124. Thereby, the position of an end portion 131t of the first part 131 most proximate to the second part 132 becomes higher than the position of an end portion 132t of the second part 132 most proximate to the first part 131. As a result, the contact between the first part 131 and the second part 132 after melting the fuse part 133 can be suppressed.

In particular, there are cases where vibrations occur according to how the battery module 100 is used, e.g., when mounted in a vehicle, etc. In such a case, the positional relationship between the first battery 110c1 and the second battery 110c2 may change. When the positional relationship between the first battery 110c1 and the second battery 110c2 changes, the positional relationship between the separated first and second parts 131 and 132 also may change. By setting the position of the end portion 131t of the first part 131 most proximate to the second part 132 to be higher than the position of the end portion 132t of the second part 132 most proximate to the first part 131, the contact of the first and second parts 131 and 132 can be suppressed even if the positional relationship between the separated first and second parts 131 and 132 changes.

At least a portion of the melted fuse part 133 may fall due to gravity. In such a case, the portion of the fuse part 133 that fell is positioned on the cover part 122a. The penetration into the housing 120 of the fallen portion of the fuse part 133 can be suppressed thereby. As a result, contact of the fallen portion of the fuse part 133 with other components such as the batteries 110 in the housing 120, the control circuit of the batteries 110, etc., can be suppressed.

Because the fuse part 133 is positioned between the first protrusion 123 and the second protrusion 124 when viewed from above, the melted fuse part 133 easily falls between the first protrusion 123 and the second protrusion 124. Thereby, the fallen portion of the fuse part 133 can be prevented from moving over the cover part 122a and penetrating the housing 120 through a through-hole 112h or the like when the battery module 100 vibrates, etc.

Effects of the embodiment will now be described.

The battery module 100 according to the embodiment includes the cover member 122. The cover member 122 includes the cover part 122a and the support part 122c. The cover part 122a is located below the bus bar 130, covers the first battery 110c1 and the second battery 110c2, and leaves the first terminal 113a1 and the second terminal 113a2 exposed. The support part 122c is located on the cover part 122a and supports the first part 131 so that the position of the end portion 131t of the first part 131 most proximate to the second part 132 is higher than the position of the end portion 132t of the second part 132 most proximate to the first part 131 in the state in which the fuse part 133 has melted and the first part 131 and the second part 132 are separated. Therefore, the contact between the first part 131 and the second part 132 after the fuse part 133 has melted can be suppressed. Also, the fallen portion of the fuse part 133 can be prevented from contacting the first battery 110c1 and the second battery 110c2 by the cover member 122. A battery module 100 that has high reliability can be provided thereby.

The support part 122c includes the first protrusion 123 that protrudes upward from the cover part 122a and is positioned below the first part 131, and the second protrusion 124 that protrudes from the cover part 122a toward the bus bar 130, is positioned below the second part 132, and includes the upper end 124t that is positioned lower than the position of the upper end 123t of the first protrusion 123. Therefore, the position of the end portion 131t of the first part 131 most proximate to the second part 132 can be higher than the position of the end portion 132t of the second part 132 most proximate to the first part 131 in the state in which the fuse part 133 has melted and the first part 131 and the second part 132 are separated.

The fuse part 133 is positioned between the first protrusion 123 and the second protrusion 124 when viewed from above in the state in which the fuse part 133 has not melted. Thereby, the fuse part 133 easily falls between the first protrusion 123 and the second protrusion 124 when melting. Therefore, the fallen portion of the fuse part 133 can be prevented from moving over the cover part 122a and penetrating the housing 120 when the battery module 100 vibrates, etc.

The second part 132 is separated from the support part 122c in the state in which the fuse part 133 has not melted. Therefore, the position of the end portion 132t of the second part 132 most proximate to the first part 131 can be low in the state in which the fuse part 133 has melted.

The bus bar 130 is a metal foil. Therefore, even if the positional relationship between the first battery 110c1 and the second battery 110c2 is changed by a vibration of the battery module 100, etc., the bus bar 130 can deform to accommodate the change of the positional relationship. Therefore, the load that is applied to the connection part between the bus bar 130 and the first battery 110c1 and/or the connection part between the bus bar 130 and the second battery 110c2 can be suppressed. Because such a bus bar 130 easily deforms, gravity is utilized to cause the second part 132 to easily fall when the fuse part 133 melts and the first part 131 and the second part 132 are separated.

Second Embodiment

A second embodiment will now be described.

Figure 6A:
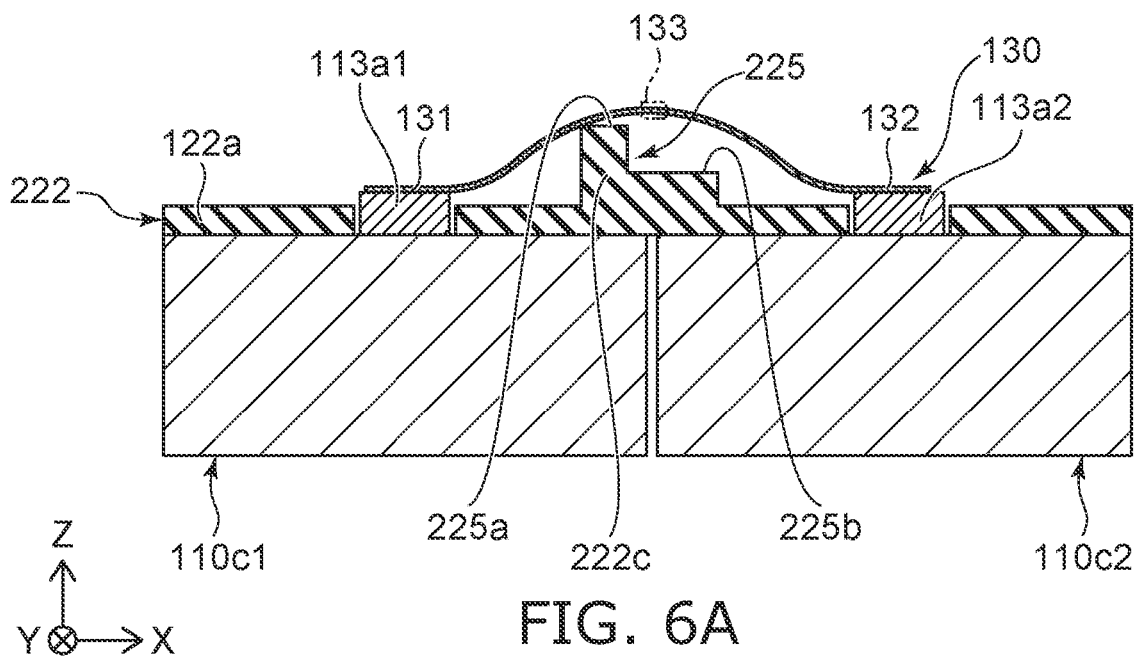
FIG. 6A is a cross-sectional view showing a state before a fuse part of a bus bar according to a second embodiment has melted.
Figure 6B:
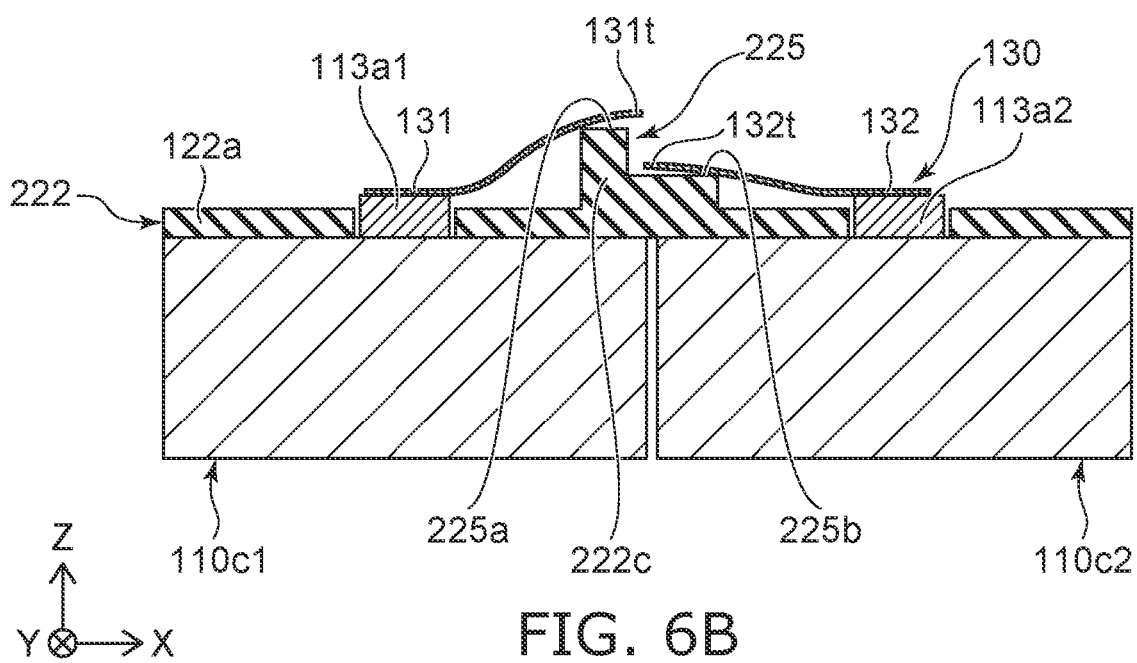
FIG. 6B is a cross-sectional view showing a state after the fuse part has melted.

FIG. 6A is a cross-sectional view showing a state before the fuse part of the bus bar according to the embodiment has melted; and FIG. 6B is a cross-sectional view showing a state after the fuse part has melted.

The shape of a support part 222c of a cover member 222 according to the embodiment is different from the cover member 122 according to the first embodiment.

The support part 222c protrudes upward from the cover part 122a. A step 225 is provided in the upper surface of the support part 222c so that the position of a surface 225a facing the first part 131 is higher than the position of a surface 225b facing the second part 132. When the fuse part 133 melts and the first part 131 and the second part 132 are separated, the first part 131 is supported by the surface 225a; and the second part 132 is supported by the surface 225b. The fallen portion of the fuse part 133 is located on the surface 225a or the surface 225b.

Accordingly, by such a configuration as well, the position of the end portion 131t of the first part 131 most proximate to the second part 132 can be higher than the position of the end portion 132t of the second part 132 most proximate to the first part 131 in the state in which the fuse part 133 has melted and the first part 131 and the second part 132 are separated.

The support part 222c is located below the fuse part 133. Therefore, the propagation of the heat of the fallen portion of the fuse part 133 to the first battery 110c1, the second battery 110c2, etc., can be suppressed.

Third Embodiment

A third embodiment will now be described.

Figure 7A:
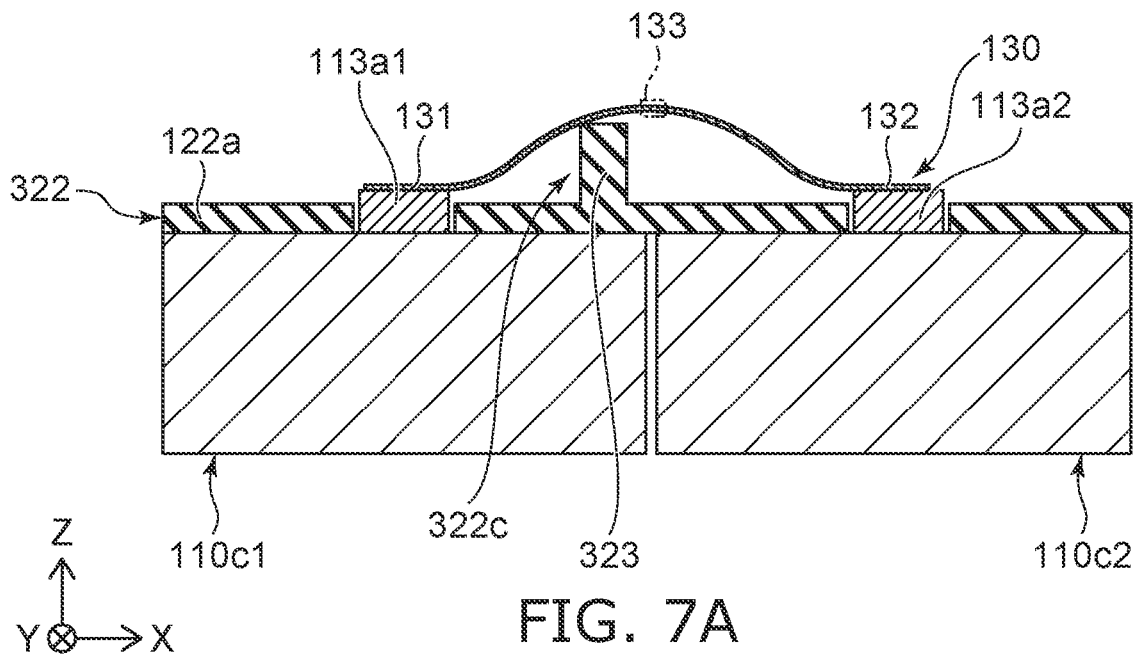
FIG. 7A is a cross-sectional view showing a state before a fuse part of a bus bar according to a third embodiment has melted.
Figure 7B:
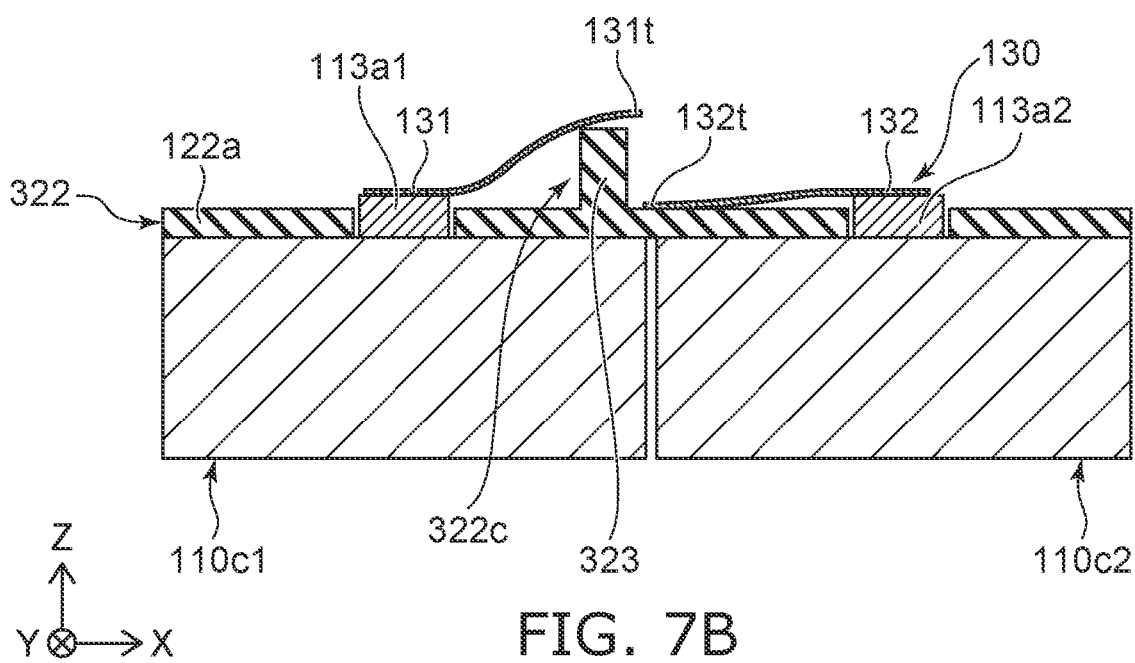
FIG. 7B is a cross-sectional view showing a state after the fuse part has melted.

FIG. 7A is a cross-sectional view showing a state before the fuse part of the bus bar according to the embodiment has melted; and FIG. 7B is a cross-sectional view showing a state after the fuse part has melted.

The shape of a support part 322c of a cover member 322 according to the embodiment is different from the cover member 122 according to the first embodiment.

The support part 322c is made of only a protrusion 323 located below the first part 131 of the bus bar 130. When the fuse part 133 melts and the first part 131 and the second part 132 are separated, the first part 131 is supported by the protrusion 323; and the second part 132 is supported by the cover part 122a.

By such a configuration as well, the position of the end portion 131t of the first part 131 most proximate to the second part 132 can be higher than the position of the end portion 132t of the second part 132 most proximate to the first part 131 in the state in which the fuse part 133 has melted and the first part 131 and the second part 132 are separated.

An example is described in embodiments described above in which the cover member functions as the outer lid of the housing. However, the housing may include a housing member that houses the multiple batteries and a lid member that is located on the housing member; and the cover member may be located between the lid member and the multiple batteries. In other words, the cover member may function as an inner lid.

Thus, according to embodiments, a battery module that has high reliability is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. A battery module, comprising:
   a first battery including a first terminal;
   a second battery including a second terminal;
   a bus bar located above the first and second batteries, the bus bar being flexible and including
     a first part connected to the first terminal,
     a second part connected to the second terminal, and
     a fuse part positioned between the first part and the second part and linked to the first and second parts, the fuse part being meltable by a lower current than the first and second parts; and
   a cover member located below the bus bar, the cover member being insulative and including
     a cover part covering the first and second batteries and leaving the first and second terminals exposed, and
     a support part located on the cover part,
   in a state in which the fuse part has melted and the first and second parts are separated, the support part supports the first part so that a position of an end portion of the first part most proximate to the second part is higher than a position of an end portion of the second part most proximate to the first part.

2. The module according to claim 1, wherein the support part includes:
   a first protrusion positioned below the first part, the first protrusion protruding upward from the cover part; and
   a second protrusion positioned below the second part, the second protrusion protruding upward from the cover part, and
   a position of an upper end of the second protrusion is lower than a position of an upper end of the first protrusion.

3. The module according to claim 2, wherein the fuse part is positioned between the first protrusion and the second protrusion when viewed from above in a state in which the fuse part is not melted.

4. The module according to claim 1, wherein the support part protrudes upward from the cover part, and a step is provided in an upper surface of the support part so that a position of a surface facing the first part is higher than a position of a surface facing the second part.

5. The module according to claim 1, wherein the bus bar is deflected to be convex upward in a state in which the fuse part is not melted.

6. The module according to claim 1, wherein the second part is separated from the support part in a state in which the fuse part is not melted.

7. The module according to claim 1, wherein the bus bar is a metal foil.

* * * * *